United States Patent [19]

Berler

[11] 3,763,356

[45] *Oct. 2, 1973

[54] UNIDIRECTIONAL FLUORESCENT INK IMPRINTED CODED DOCUMENT AND METHOD OF DECODING

[75] Inventor: Robert M. Berler, Westport, Conn.

[73] Assignee: Pitney Bowes-Alpex, Inc., Commerce Park, Danbury, Conn.

[ * ] Notice: The portion of the term of this patent subsequent to Oct. 19, 1988, has been disclaimed.

[22] Filed: May 17, 1971

[21] Appl. No.: 144,237

Related U.S. Application Data

[63] Continuation of Ser. No. 822,162, May 6, 1969, abandoned.

[52] U.S. Cl. . 235/61.12 N, 235/61.11 E, 250/71 R, 250/219 D

[51] Int. Cl. ........................ G01n 21/38, G06k 19/00

[58] Field of Search ........................ 235/61.11, 61.12; 250/71 R, 219 DC, 219 D, 83.3 UV

[56] References Cited

UNITED STATES PATENTS 3,614,430 10/1971 Berler ........................ 235/61.11 E 3,279,826 10/1966 Rudershausen ................. 235/61.12

*Primary Examiner*—Thomas A. Robinson

*Attorney*—Arthur J. Plantamura

[57] ABSTRACT

A photo optical document having a unidirection readout characteristic comprising a substantially ultraviolet light filtering translucent matrix or substrate upon which coded information is imprinted with fluorescent ink. This combination allows the coded document to be read only when the proper side of the document faces the reader light; if the wrong side faces the light, no readable glow will be emitted by the fluorescent ink. The document is read by placing a source of ultra violet light on one side of the document and the photoelectric sensor on the other side of the document.

7 Claims, 5 Drawing Figures

PATENTED OCT 2 1973 | 3,763,356

*INVENTOR.*
ROBERT M. BERLER
BY
Arthur J. Plantamura
ATTORNEY.

UNIDIRECTIONAL FLUORESCENT INK IMPRINTED CODED DOCUMENT AND METHOD OF DECODING

This invention relates to a novel, fluorescent ink imprinted photo optical readable document such as a card, tape, ticket, etc., comprising a translucent ultraviolet light filtering substrate on which coded information is imprinted and which is adapted to be read by a machine.

Normally a machine readable document, whether it be punched or marked, is capable of reading out false information if it is placed in the reader in reverse fashion or if it is inverted. In particular, a punched card or ticket can be inserted into a reader in four possible ways. Only one way will yield correct information. For example, the code of a number punched in a document could become the code of another number if the document was inserted into the reader wrong side up. The punched holes could represent still another number if the document was inserted into the reader wrong end first.

In the case of marked documents, as distinguished from punched hole documents, there are only two possible ways to get a decoded output. One will be correct and the other will be incorrect. This is possible with right side up, normal feed and right side up reverse feed. There will be no decoded output, if the card is put into the reader wrong side up as the reader will not be able to sense the marks.

The prevention of these false readouts poses considerable difficulties with the punched hole or marked documents insofar as sensing which mark or hole is legitimate because the sensor detects only the presence or absence of a hole or mark.

The present application provides an improvement over the copending application of Robert M. Berler filed on Mar. 10, 1969, Ser. No. 805,421 now U.S. Pat. No. 3,614,430 entitled Fluorescent Ink Imprinted Coded Document and Method and Apparatus For Use In Connection Therewith.

As disclosed in that application, one of the most practical machine readable documents from a technical viewpoint is the punched card or punched tape; this is due to the excellent signal to noise ratio offered by the combination of an opaque card and a hole therein through which light passes. The fluorescent ink imprinted translucent document disclosed in that application obviates a number of disadvantages in using the punched document, e.g., such as occur in the making of the punched document. Also, for example, a computer produced fluorescent ink imprinted document as distinguished from the punched hole document is both machine and human readable.

The document disclosed in U.S. Pat. No. 3,614,430, as well as a punched hole document, however, has the drawback that it may be read bi-directionally. The present invention provides the means whereby a fluorescent ink imprinted translucent document may be rendered unidirectional, i.e., so that it functions only if inserted into a reader with the proper side facing the light source.

OBJECTS OF THE INVENTION

It is an object of this invention to provide a novel document bearing coded intelligence comprising a light filtering substantially translucent substrate imprinted with fluorescent ink.

It is another object of the invention to provide a novel tape, ticket, or other document containing coded intelligence which may essentially utilize conventional photoelectric sensing apparatus.

It is a further object of the invention to provide a novel system for imprinting and reading coded intelligence which employs a light filtering substantially translucent document with fluorescent marking and a document reader capable of photoelectrically sensing the intelligence from the reverse side of the document with fluorescent imprint.

It is another object of the invention to provide a system which obviates the disadvantages inherent in generating punched hole documents and yet has excellent signal to noise ratio.

SUMMARY OF THE INVENTION

In the present invention, the machine readable document essentially comprises a tape, card, ticket, etc., of translucent paper or other suitable composition such as a synthetic plastic which has coded information imprinted thereon with fluorescent ink and which incorporates a UV light filter so that on exposure to ultraviolet light the document provides a readout in one direction only. The imprint of fluorescent ink is applied on the reverse face of the document which is to be read by the sensors, such as photoelectric cells; the filter media which is incorporated in the document is interposed between the imprint and the sensors. The sensing means are conventional light responsive elements which read the coded information after the fluorescent imprint is energized by a suitable UV light source and projects its fluorescent glow through the document. The light responsive means, i.e., the reader, may be connected to a suitable data processor by means of a conventional decoder.

With the document of the present invention as with that disclosed in U.S. Pat. No. 3,614,430, since there is no requirement that light be projected on the surface of the document to generate a fluorescent response by reflection, the photoelectric sensor may be placed close to the document, i.e., practically in contact with, but not touching, the face of the document. This capability will result in greater light utilization by the light sensors, enhancing the signal to noise ratio.

These and other objects of the present invention will become more fully apparent from the following specification and claims when considered in conjunction with the accompanying drawing wherein:

Figure 3:
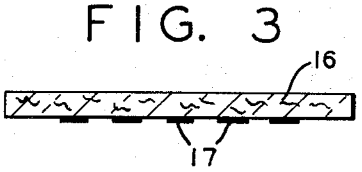
FIG. 3 is a cross sectional view similar to FIG. 2 of an alernate embodiment in which the UV light filtering characteristic is an integral part of the substrate composition.
Figure 4:
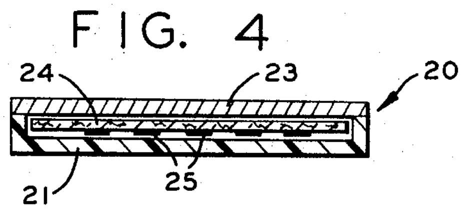
FIG. 4 is a cross sectional view of another embodiment in which a holder for the document is provided wherein one surface of the holder is clear, i.e., colorless, whereas the other surface is ultraviolet light filtering, e.g., amber colored.
Figure 5:
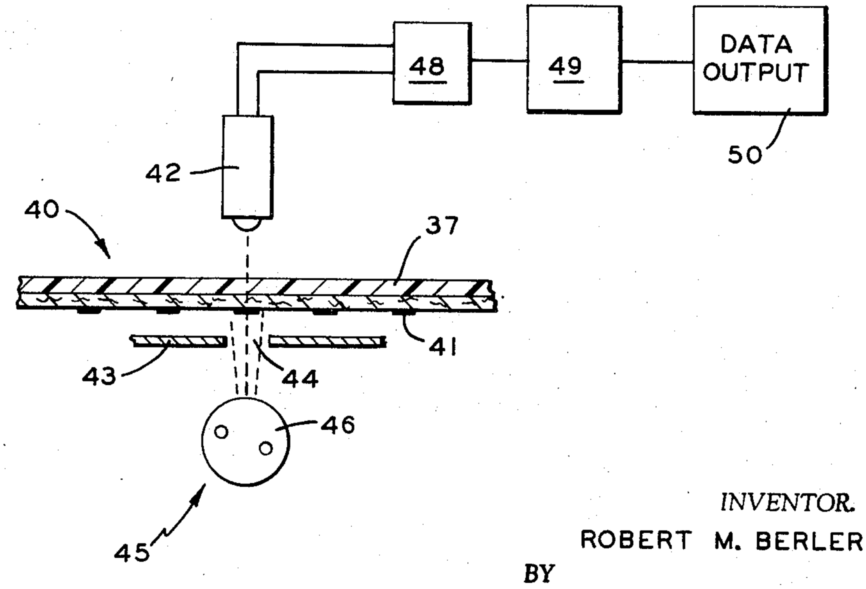
FIG. 5 is a diagrammatic view of a system of the kind contemplated for use in connection with the document of the invention showing the document in the reading device and a block diagram to illustrate a circuitry useable with the reader.

The novel document embodiments of which are depicted in FIGS. 1–4 and the means for its utilization in accordance with the invention, as depicted in FIG. 5 and described below comprises a system which employs an optical reader which has the simplest type of optics compared with an optical reader that detects marks on the surface of a document by reflected light. The resolution for the punched document is high and the signal to no-signal ratio is also high. Such readers are arranged so that the light will be on one side of the document and the optical sensors will be on the other side.

The substrate on which the new document is printed may be any suitable composition and may include paper as well as plastic sheet or tape characterized as having substantial translucence, e.g., a thin bond paper, pad paper, yellow teletype tape, tracing paper or other similar paper, or plastic, e.g., a nylon, a polyester, a polyolefin such as polyethylene or polypropylene, polystyrene, polyvinyl chloride, polyvinyl acetate, a cellulose ester such as cellulose acetate and the like which is suitably pigmented, for example. The filtering component of the document as will be described in greater detail hereafter may be inherent in the document composition, e.g., such as by incorporating a suitable dye or it may comprise a supplemental film or layer applied to the surface of the translucent document. The fluorescing ink or printing pigment must be the kind which will fluoresce the selected color for the optical sensor, e.g., an orange or red color under ultraviolet light. In the case of a red-orange fluorescence, the light source will be an ultraviolet (black light) light source such as a fluorescent tube rich in UV. Preferably it is used in conjunction with a UV filter to cut out all visible light. Actually, a small amount of bluish purple light will pass through the UV filter and will be present. The photo sensors in the reader suitable for use with fluorescence in the orange-red portion of the spectrum are silicon photo transistor devices. Such sensors are most sensitive in the region of the orange, red and near infra-red part of the spectrum. The response of these silicon devices in the blue and green portion of the spectrum is very low, i.e., a small percentage of the response which results from the red portion of the spectrum; as a practical matter, these devices are nearly blind to blue and green.

As noted above, in both the punched hole document and the document of U.S. Pat. No. 3,614,430 light can pass through the document from either direction. In particular, the fluorescent ink mark on the translucent document can be irradiated from either side of the translucent substrate causing it to glow. The glow of the ink mark will then be picked up by the light sensor which ever way the ultraviolet light strikes the fluorescent ink. However unlike the bi-directional characteristics of the punched hole document, the bi-directional characteristics of the fluorescent ink imprinted translucent document can be modified so that it becomes unidirectional. That is, the document will function only if it is put into the reader with a specified side up. Thus, properly inserted into the reader, the fluorescent ink marks will emit light. If the wrong side of the document is up, no light will be emitted by the fluorescent ink. This unidirectional quality can be accomplished by placing a UV light filter against one surface of the translucent document, i.e., the surface opposite that on which the fluorescent ink marks are printed. This light filter must be able to attenuate the ultraviolet light part of the spectrum while allowing the yellow, orange, and red colors of the glowing fluorescent ink to pass with very little attenuation. Thus, if the surface of the document having the light filter, rather than the fluorescent print, faces the ultraviolet light source, it would prevent the ultraviolet light from irradiating the fluorescent ink; no glow would be produced by the fluorescent ink and the decoding light sensors would remain inactive. However, when the surface of the document which is imprinted with the fluorescent ink is facing the ultraviolet light source, the fluorescent ink will glow in yellow, orange, or red. This glow would be transmitted through the translucent document, through the light filter which can pass these colors, then into the decoding sensors where these marks will be detected. The filter just described is a low pass filter. It will filter out all light from ultraviolet to yellow green while it will pass yellow to the deep red colors. All wavelengths shorter than 560 millimicrons will be attenuated greatly while wavelengths longer than 560 millimicrons will be transmitted with very little attenuation.

Figure 1:
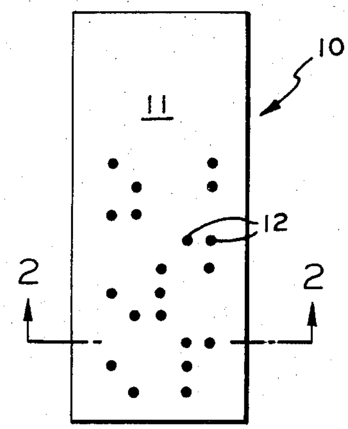
FIG. 1 is an illustration of the face of a substantially translucent document imprinted with coded information by means of fluorescent ink and embodying a UV light filter according to the invention.
Figure 2:
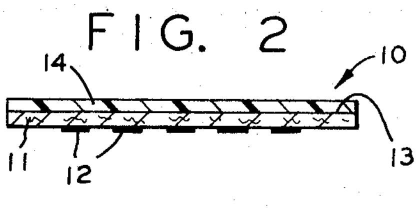
FIG. 2 is a cross sectional view of the document taken substantially along line 2—2 of FIG. 1.

Referring to FIGS. 1 and 2, a document 10 of conventional configuration and formed of translucent material with fluorescent imprinted information 12 applied to the face 11 of the document is shown. As the filter, for example, a piece of amber colored cellophane 14 (see FIG. 2) or other suitable light filtering layer, is placed against the other surface 13 of the document. Alternately, the filter medium used may be inherent in the composition of the document itself, i.e., the light filtering characteristic of the substrate may be obtained by incorporating in the substrate forming composition suitable filter type dyes or selective UV absorbents of the kind and by means recognized by those skilled in the art, such as the absorbents disclosed, for example, in U. S. Pat. Nos. 3,126,414 and 3,192,179. An embodiment of the latter type is shown in FIG. 3 wherein a substrate 16 which is both translucent and filters out or absorbs the range of light from ultraviolet to yellow green may be used as the document upon which the fluorescent ink coded information 17 is imprinted. Additionally, in lieu of such filter layers applied by coating, laminating, etc., a plastic holder as shown in the embodiment of FIG. 4 may be provided. As shown, the plastic holder 20 for the document may comprise the surface 21 which is clear and colorless while the other surface 23 spaced from the first may be amber colored and comprises the filter. The document 24 may be slipped into the space in the plastic holder with the side of the document imprinted with fluorescent ink 25 placed against the clear colorless plastic 21 which is exposed to the reader lamp.

It is thus seen that various alternate means for achieving the filtering capacity in the document may be utilized, i.e., the reverse side of the translucent document may be coated with a filter type dye or a filter type plastic coating or laminate may be applied against the document or the translucent substrate itself may be characterized to ultraviolet opaque toultraviolet rays while allowing translucent light waves longer than 560 millimicrons to pass through it.

It is important that the substrate itself does not fluoresce under the ultraviolet radiation. Any light that it would produce will degrade the signal-to-noise ratio. If the substrate does itself fluoresce to some extent, it should do so in the blue or short wave part of the spectrum where it will not be seen by the color blind photo sensor. The photo sensor is made to have almost no response to the blue end of the spectrum while its response will be greatest toward the red end of the spectrum.

By combining the advantages of imprinting the translucent document with fluorescent ink and by also offsetting the imprinting by one line or more so that the document is nonsymmetrical, the document can be decoded in one way only, accordingly obviating possibilities of erroneous readout.

FIG. 5 depicts an arrangement which may be used for scanning the light impulses from fluorescent markings. The document, e.g., ticket or tape 40 having the fluorescent ink spots or bars 41 on the reverse side from the photo sensor 42 and filtering medium 37 is moved past a guide plate 43 which has a slot 44 through which a suitable slit of light is projected onto the surface of the fluorescent imprint 41. Behind the slot 44 there is a light source 45 preferably a UV fluorescent lamp provided with a filter envelope 46, or other filter, which allows ultraviolet light but substantially no visible light to pass. The filtering layer 37 substantially blocks all other light except the light glow generated by the fluorescent ink 41 which passes through the filter 37 and is transmitted to the photoelectric element. Various means not shown for movement of the document past the photoelectric sensors are well known in the art. The signal sensed by the photoelectric sensor 42 is processed in a conventional manner such as through the amplifier 48 and the decoder 49 to provide the desired output for a computer at 50.

While the invention has been described by reference to specific particulars in order to provide a full, clear, and concise explanation of the inventive contribution, various modifications in the invention will be apparent to those skilled in the art without departing from the scope and spirit of the invention.

What is claimed is:

1. A machine readable code system comprising a fluorescent ink imprinted coded document characterized in that the coded intelligence is readable from one side only by impinging ultraviolet light on the printed side of the document and reading the coded information from the other side, a reader associated with said document including a photoelectric sensor, an ultraviolet light source, and means for positioning said document for reading between said sensor and light source, said document comprising a substantially translucent substrate, and an ultraviolet light filtering layer in combination with said substrate, and having intelligence imprinted with fluorescent ink on one side of said substrate, said document being such that said printed intelligence will fluoresce and be readable only when the imprinted side of the document is exposed to ultraviolet light.

2. The code system of claim 1 wherein the ultraviolet light filtering layer is an integral part of said translucent substrate.

3. The code system of claim 1 wherein the ultraviolet light filtering layer comprises a film or sheet laminated to said substrate.

4. The code system of claim 1 wherein the ultraviolet light filtering layer comprises a separate adaptor associated with said substrate.

5. The code system of claim 1 wherein the substrate is composed of a material which is substantially translucent to yellow, orange or red fluorescent light and otherwise characterized by filtering said ultraviolet light.

6. The code system of claim 1 wherein the coded document is imprinted with fluorescent ink in the red-orange range of the color spectrum.

7. A method of recording coded intelligence on, and electronically retrieving said intelligence from a printed document which is translucent to fluorescent light, comprising imprinting intelligence with fluorescent ink on a fluorescent light translucent substrate, exposing the side of the substrate with the imprinted intelligence to a source of ultraviolet light by positioning said document between an ultraviolet light source and a photoelectric sensor of a coded document reading device, providing as a part of said document an ultraviolet light blocking fluorescent light translucent layer which is interposed between said imprinted intelligence and the photoelectric sensor, photoelectrically sensing said imprinted intelligence which has been activated by said ultraviolet light through the printed document and utilizing the intelligence data output thus derived photoelectrically from said fluorescent imprint.

* * * * *